United States Patent
V et al.

(10) Patent No.: US 10,565,355 B2
(45) Date of Patent: Feb. 18, 2020

(54) TECHNIQUES OF MANAGING LICENSES OF VIRTUAL DESKTOPS

(71) Applicant: AMZETTA TECHNOLOGIES, LLC, Norcross, GA (US)

(72) Inventors: Caarthyk Mano Sundar V, Chennai (IN); Prasath S, Chennai (IN)

(73) Assignee: AMZETTA TECHNOLOGIES, LLC, Norcross, GA (US)

(*) Notice: Subject to any disclaimer, the term of this patent is extended or adjusted under 35 U.S.C. 154(b) by 103 days.

(21) Appl. No.: 15/647,474

(22) Filed: Jul. 12, 2017

(65) Prior Publication Data

US 2019/0018935 A1 Jan. 17, 2019

(51) Int. Cl.
| | |
|---|---|
| G06F 21/00 | (2013.01) |
| G06F 21/10 | (2013.01) |
| G06F 9/455 | (2018.01) |
| G06F 21/12 | (2013.01) |
| G06F 9/451 | (2018.01) |

(52) U.S. Cl.
CPC ........ *G06F 21/105* (2013.01); *G06F 9/45558* (2013.01); *G06F 21/126* (2013.01); *G06F 9/452* (2018.02); *G06F 21/10* (2013.01); *G06F 21/12* (2013.01)

(58) Field of Classification Search
CPC ...... G06F 21/105; G06F 21/126; G06F 21/12; G06F 21/10; G06F 9/45558
USPC ........................................................ 726/22
See application file for complete search history.

(56) References Cited

U.S. PATENT DOCUMENTS

| | | | | |
|---|---|---|---|---|
| 2004/0054909 | A1* | 3/2004 | Serkowski | G06F 21/10 713/176 |
| 2010/0205303 | A1* | 8/2010 | Chaturvedi | G06F 21/10 709/226 |
| 2011/0289003 | A1* | 11/2011 | Womack | G06F 21/10 705/59 |
| 2012/0072898 | A1* | 3/2012 | Pappas | G06F 21/10 717/171 |
| 2012/0084381 | A1* | 4/2012 | Alladi | G06F 9/544 709/213 |
| 2013/0191923 | A1* | 7/2013 | Abuelsaad | G06F 21/10 726/26 |
| 2013/0262250 | A1* | 10/2013 | Lingafelt | G06Q 30/06 705/26.1 |
| 2015/0332025 | A1* | 11/2015 | Nakamura | G06F 21/105 726/26 |

* cited by examiner

*Primary Examiner* — Kendall Dolly
*Assistant Examiner* — Kevin Ayala
(74) *Attorney, Agent, or Firm* — Locke Lord LLP; Tim Tingkang Xia, Esq.

(57) ABSTRACT

In an aspect of the disclosure, a method, a computer-readable medium, and a system for managing a collection of virtual desktops are provided. The system receives, at a license manager and from a first virtual desktop of the collection of virtual desktops, a first request to validate a license for the first virtual desktop. The system also determines whether a license is available for the first virtual desktop. The system further sends a validation status message to the first virtual desktop to indicate whether a license is available for the first virtual desktop based on the determination.

14 Claims, 6 Drawing Sheets

TECHNIQUES OF MANAGING LICENSES OF VIRTUAL DESKTOPS

BACKGROUND

Field

The present disclosure relates generally to networked computer systems, and more particularly, to techniques of managing and enforcing licenses assigned to a collection of virtual desktops of a customer.

Background

The statements in this section merely provide background information related to the present disclosure and may not constitute prior art.

Computer virtualization is a technique that involves abstracting a physical computing machine platform into a virtual machine (VM) that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management, and hardware cost reduction reasons, virtual machines have been used to support virtual desktops for use in an organization in place of physical workstations. A collection of virtual desktops may be created on a virtual desktop infrastructure (VDI) system for a customer. Further, a limited number of licenses may be assigned to the customer to use the collection of virtual desktops. Therefore, there is a need to manage and enforce the virtual desktop in use according to the assigned number of licenses.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a system for managing a collection of virtual desktops are provided. The system receives, at a license manager and from a first virtual desktop of the collection of virtual desktops, a first request to validate a license for the first virtual desktop. The system also determines whether a license is available for the first virtual desktop. The system further sends a validation status message to the first virtual desktop to indicate whether a license is available for the first virtual desktop based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
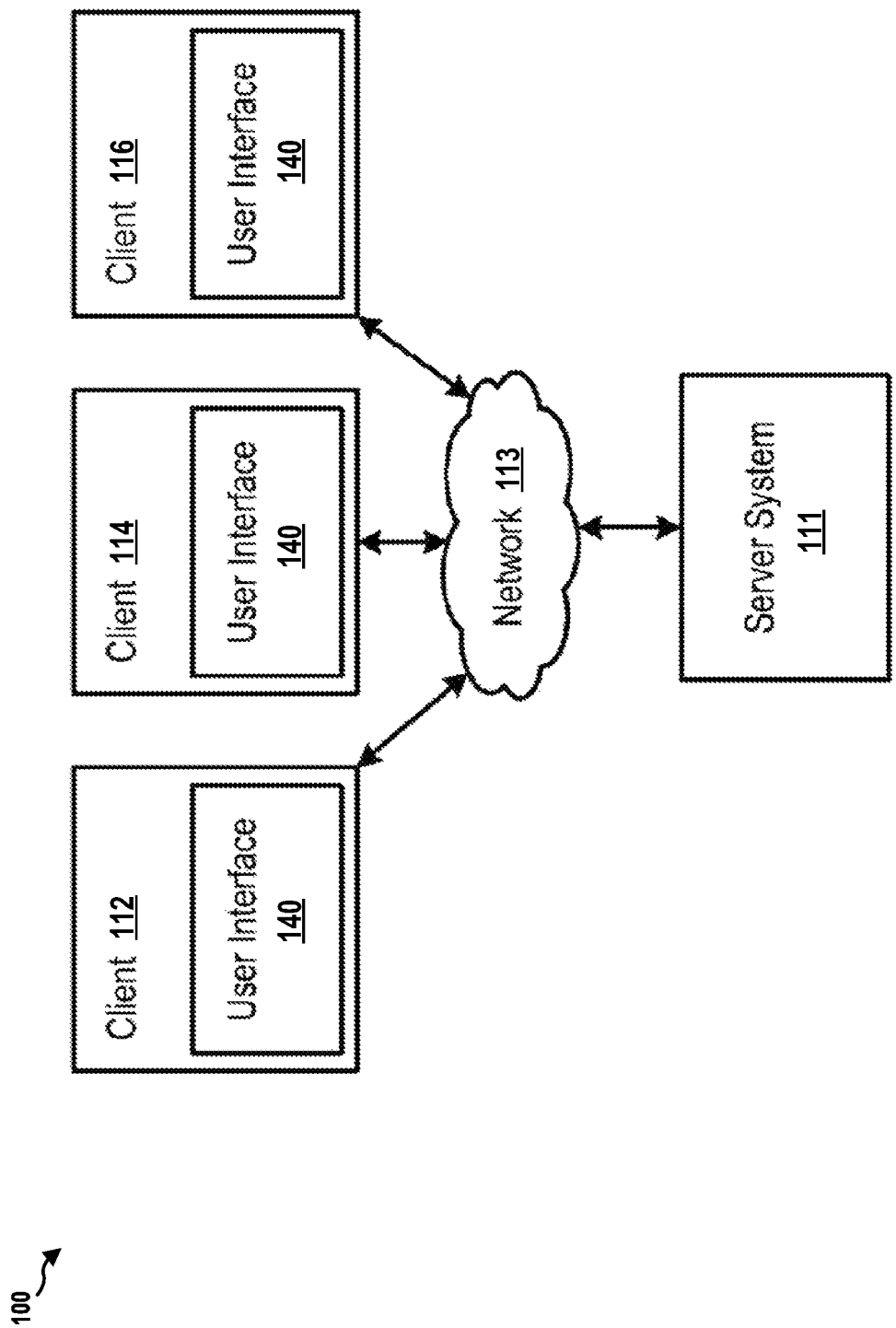
FIG. 1 illustrates a VDI system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

For ease of deployment, software management, and hardware cost reduction reasons, virtual machines have been used to support virtual desktops for use in an organization in place of physical workstations. A collection of virtual desktops may be created on a virtual desktop infrastructure (VDI) system for a customer. Further, a limited number of licenses may be assigned to the customer to use the collection of virtual desktops. Therefore, there is a need to manage and enforce the virtual desktop in use according to the assigned number of licenses.

FIG. 1 illustrates a virtual desktop infrastructure (VDI) system 100. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "handheld," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

The VDI system 100 includes a VDI server system 111 in data communication over a network 113 with several VDI client systems 112, 114, and 116. The network 113 may be any configuration, such as a local area network (LAN), or private or publicly accessible wide area network (WAN), such as the Internet. It should be recognized that FIG. 1 shows a simplified representation of a typical VDI server system 111, which may include other components such as firewalls, connection brokers, and load balancers, as well as back-end storage networks, database servers, among others, as described in greater detail in FIG. 2. Each client system 112, 114, 116 may include a user interface 140 through which a user can interact with his or her desktop.

Figure 2:
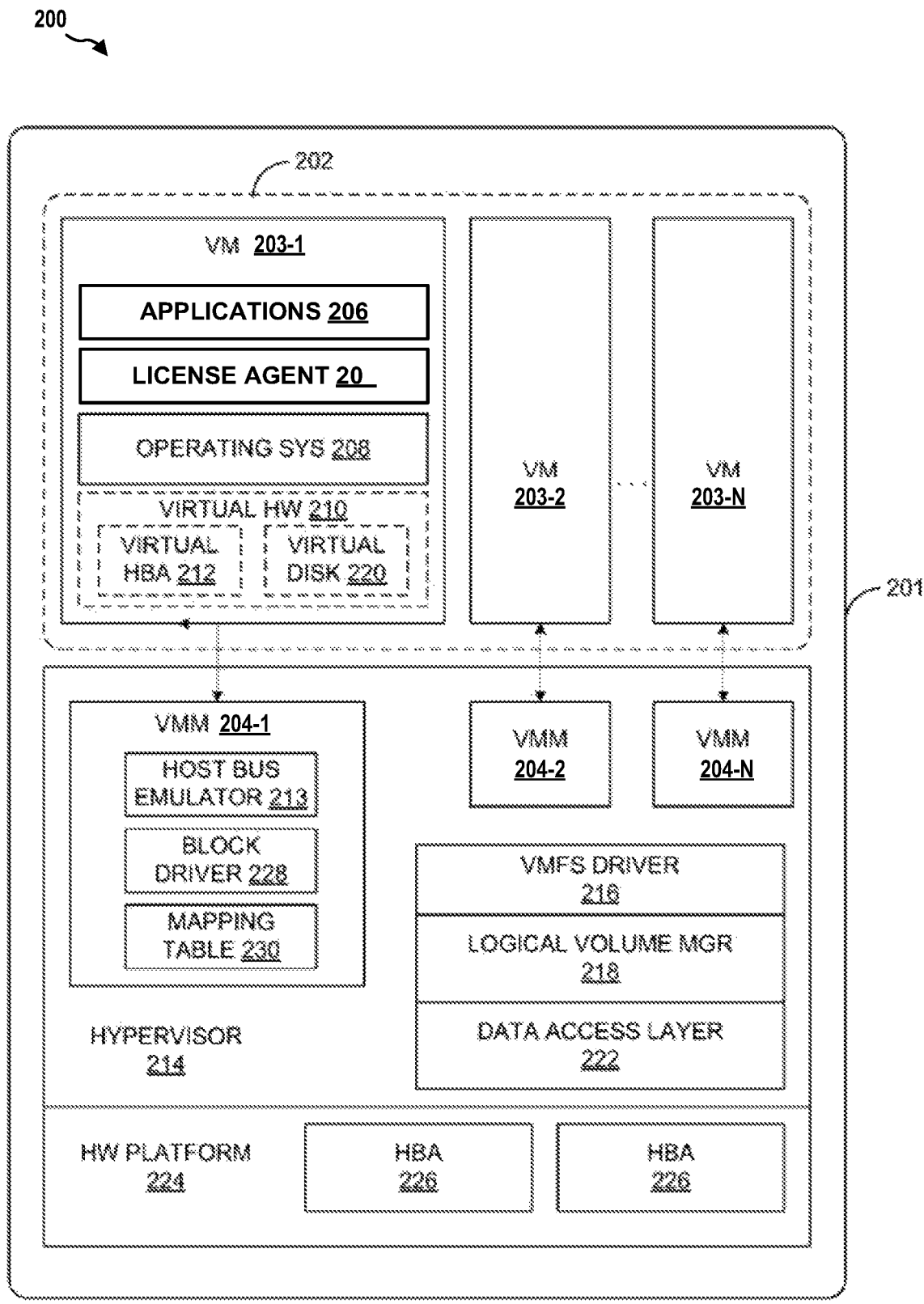
FIG. 2 is diagram illustrating a VM-based system.

FIG. 2 is diagram 200 illustrating the server system 111. The server system 111 includes an integral computer system 201 constructed on a hardware platform 224, including host bus adapters (HBAs) 226 in addition to a processor, memory, and other standard peripheral components (not separately shown). The hardware platform 224 executes a hypervisor 214 supporting a virtual machine execution space 202 within which virtual machines (VMs) 203-1 to 203-N are executed.

The hypervisor 214 provides services and support to enable concurrent execution of VMs 203-1 to 203-N. In turn, each of the VMs 203-1 to 203-N implements a virtual hardware platform 210 as a conceptual layer that supports the execution of a guest OS 208 and one or more client applications 206 (which may be encapsulated in "application containers," as further discussed below). In certain configurations, the guest operating systems 208 are instances of MICROSOFT® WINDOWS®, LINUX®, etc. Other guest operating systems can be equivalently used. In each instance, a guest OS 208 includes a native file system layer, typically either an NTFS (New Technology File System) or a ext3 (third extended) file system file system layer. These file system layer interface with the virtual hardware platforms 210 to access, from the perspective of guest operating systems 208, a data storage host bus adapter.

Further, a license agent 207 is installed on the guest OS 208 in each of the VMs 203-1 to 203-N. As described infra, the license agent 207 may send a request to a license manager after completion of a booting process of the virtual desktop (e.g., loading the operating system 208) and prior to launch any user application (e.g., the client applications 206). The license agent 207 receives a validation status message from the license manager in response to the request. The license agent 207 shuts down the virtual desktop (e.g., the operating system 208) when the validation status message indicates that a license is not available for the virtual desktop.

In one implementation, virtual hardware platform 210 implements a virtual host bus adapter 212 and a virtual-disk 220 that emulate the necessary system hardware support to enable execution of the guest OS 208 transparently to the virtualization of the system hardware.

File system calls initiated by guest OS 208 to perform file system-related data transfer and control operations on virtual-disk 220 are processed and passed through the virtual host bus adapter 212 to adjunct a virtual machine monitor (VMM) 204-1 that implements the virtual system support necessary to coordinate operation with the hypervisor 214. In particular, a host bus emulator 213 functionally in the VMM 204-1 enables the data transfer and control operations to be ultimately passed to the host bus adapters 226. Further, the VMM 204-1 may also include a block driver 228 and accesses a mapping table 230 to assist VMM 204-1 in determining a storage location of data requested by the file system calls from guest OS 208. For example, upon receiving a file system block level request to read data, the host bus emulator 213 may request the block driver 228 to determine whether the requested file blocks match an entry in mapping table 230. If mapping table 230 includes such an entry, then block driver 228 re-directs the file system block level request to a location specified in the entry of the mapping table 230 rather than allowing the file system block level request to be satisfied by a storage location of virtual-disk 220, itself, as would typically occur. In either case, file system calls for performing data transfer and control operations generated, for example, by applications 206 are translated and passed to a virtual machine file system (VMFS) driver or component 216 that manages access to files (e.g., virtual disks, etc.) stored in data storage systems networked with the server system 111 that may be accessed by any of the VMs 203-1 to 203-N.

For example, a guest operating systems 208 can receive file system calls and perform corresponding command and data transfer operations against virtual disks, such as virtual SCSI (Small Computer System Interface) devices accessible through virtual HBA 212, that are visible to the guest operating systems 208 (e.g., as a virtual-disk 220, etc.). These virtual disks 220 are maintained as files stored on a VMFS, for example, in a storage system networked to the server system 111. Each such virtual-disk 220 may be maintained as a file or set of files stored on a VMFS, for example, in the networked storage system. Further, guest OS 208 file system calls are translated from instructions applicable to virtual-disk 220, which is visible to the guest OS 208, to instructions applicable to a file representing virtual-disk 220 in the networked storage system exposed by a storage system manager to the VMFS. Such translations are performed through a number of component layers of an IO (input/output) stack, beginning at the guest OS 208 (which receives the file system calls from applications 206), through the virtual HBA 212, the host bus emulator 213, the block driver 228, the VMFS driver 216, a logical volume manager 218, which assists the VMFS driver 216 with mapping files stored in the VMFS with the storage system exposed by the storage system manager, a data access layer 222, including device drivers, and host bus adapters 226 (which, for example, issue a SCSI command to the storage system manager to access storage system).

It should be recognized that the various terms, layers, and categorizations used to describe the virtualization components in FIG. 2 may be referred to differently without departing from their functionality or the spirit or scope of embodiments described herein. For example, while the block driver 228 and the mapping table 230 have been depicted as part of the VMM 204-1, it should be recognized that alternative configurations may implement the block driver 228 as part of a different component of hypervisor 214. Furthermore, while one configuration may implement a mapping table 230 for each corresponding virtual-disk 220, alternative configurations may utilize a global mapping table that includes mappings for all virtual disks. Similarly, it should be recognized that while the VMs 203-1 to 203-N may be considered separate virtualization components between the VMs 203-1 to 203-N and the hypervisor 214 (which, in such a configuration, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative configuration, for example, the conceptual layer described as virtual hardware platform 210 may be merged with and into the VMMs 204-1 to 204-N such that the virtual host bus adapter 212 may be removed from FIG. 2, as its functionality is effectuated by the host bus adapter emulator 213.

At the hypervisor level, the block driver 228 monitors for block read requests that fall into the mapping table 230. If a block read request falls into one of the mappings in the mapping table 230, the hypervisor 214 redirects the block read request to an external data storage/source that stores the requested data and then passes the data back to the file system implementation requesting the data.

In certain configurations, applications 206 that are to be delivered via the virtual desktop are encapsulated in application containers. An application container is a data structure that captures an application in an OS-neutral format. In one implementation for generating such application containers, a standard operating system is scanned as a reference point. The scanning process scans the registry and the file system and generates a list of all the components that are present. Then, the application that is being captured into the application container is installed onto the standard operating system. The installation adds one or more files and makes one or more registry changes to the system. Once the application is completely installed, a post-installation scan of the system is performed and a second list is generated that includes the new additions to the system caused by the installation. Differences in the files and registry changes (and any other changes) between the pre-installation scan list and the post-installation scan list are determined. The resulting files (including an executable of the actual application itself) and registry entries are then stored in an "application container" that may further contain a runtime component and that is itself stored, for example, within a virtual disk of a user's virtual desktop, and that serves as the executable file for the application.

When the user launches the application container (e.g., from the file system of the guest OS of the virtual desktop), the runtime component of the application container executes the code of the application itself (which is embedded in the application container, as previously discussed) and intercepts and redirects any requests by the application code to access registry values and/or files back into the application container itself, to the extent such registry values and/or files were stored in application container, as previously discussed. Because applications captured in such OS-neutral application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein.

In certain configurations, the applications 206 are do not utilize application containers and are actually installed and copied to the file system of the guest OS of the virtual desktop run in the VM 203-1.

The respective virtual desktop run in each of the VMs 203-1 to 203-N includes an OS (operating system), which can be stored in an "OS store," and one or more applications, which can be stored in an "application store," for example, to be accessed by virtual desktops in the form of application containers.

In one configuration, the OS store and/or the application store are locations in networked storage accessible by the server system 111 that respectively store a number of OS images or application containers that can be selected by an administrator or other user when generating a virtual desktop (e.g., sometimes also referred to as a blob (binary large object) store).

In one example, the virtual desktop of the VM 203-1 may include metadata for use by the file system of virtual desktop (e.g., file descriptors of application containers accessible by the file system of the guest OS, etc.) that, for example, provide data block addresses of virtual-disk 220 that purportedly store the application data.

Further, the VMM 204-1 may include a mapping table 230 for the virtual desktop for use by the hypervisor 214 that maps the data block addresses that purportedly contain the application data in virtual-disk 220 to the actual location of data blocks of the application data of a networked storage system.

Figure 3:
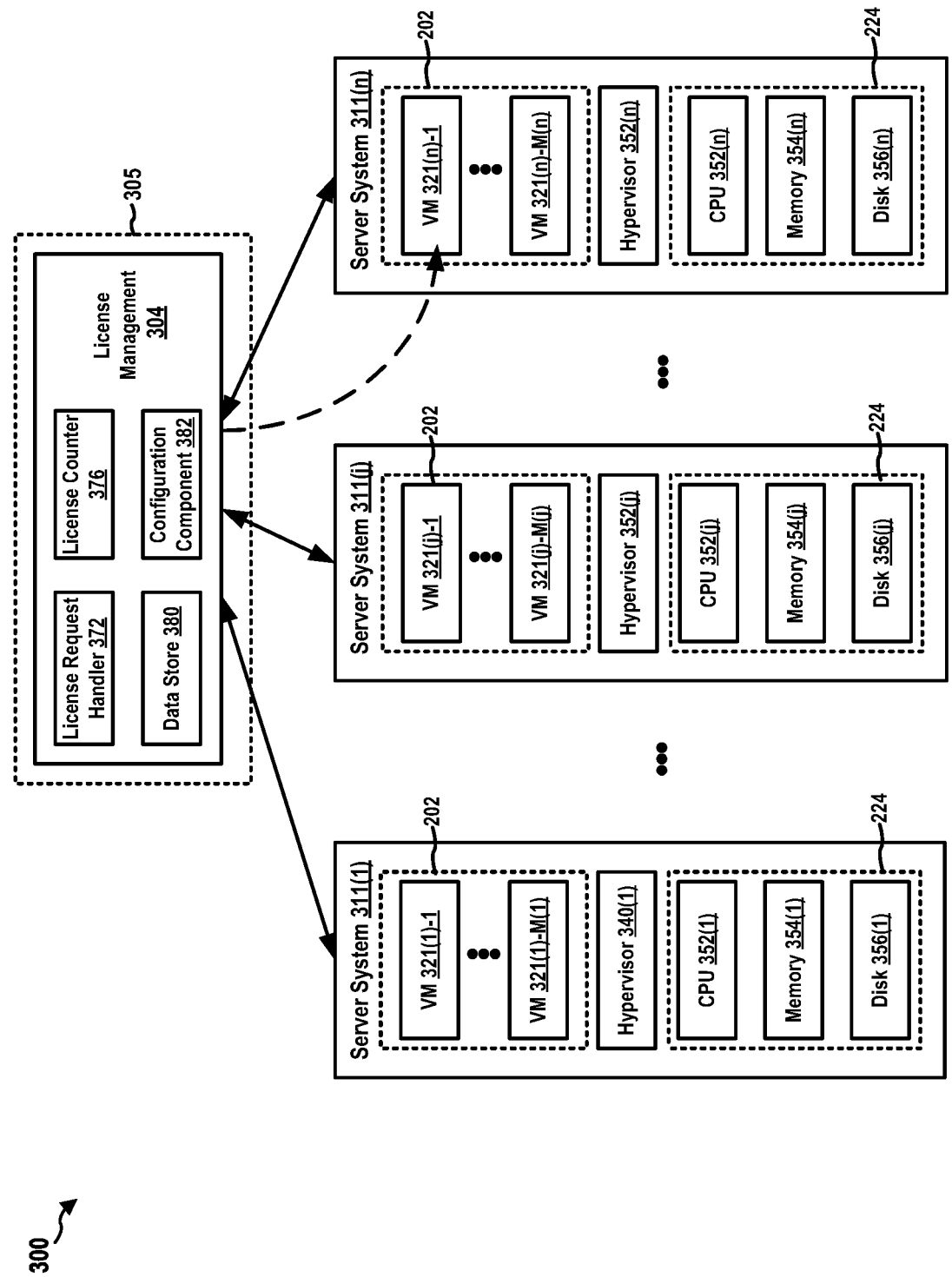
FIG. 3 is diagram illustrating server systems of the VDI system.

FIG. 3 is diagram 300 illustrating server systems 311(1) to 311(n) of the VDI system 100, n being an integer greater than 1. Each of the server systems 311(1) to 311(n) may be a system that is identical or similar to the server system 111. Using the server system 311(1) as an example, the server system 311(1) includes a hardware platform 224 having a CPU 352(1), a memory 354(1), and a disk 356(1). A hypervisor 340(1) is running on the hardware platform 224 of the server system 311(1). Further, the hypervisor 340(1) provides a virtual machine execution space 202 that is currently executing VMs 321(1)-1 to 321(1)-M(1), M(1) being an integer greater than 0. Further, as shown, the server system 311(j) and the server system 311(n) each have hardware components and software components that are similar to those of the server system 311(1).

The VDI system 100 includes license management module 304. The license management module 304 may include a license request handler 372, a license counter 376, a data store 380, and a configuration component 382. As described infra, the configuration component 382 may include configurations for the total number of licenses that have been granted to each collection of virtual machines, the number of licenses that are used by the collection, and the number of licenses that are remaining available for the collection.

Figure 4:
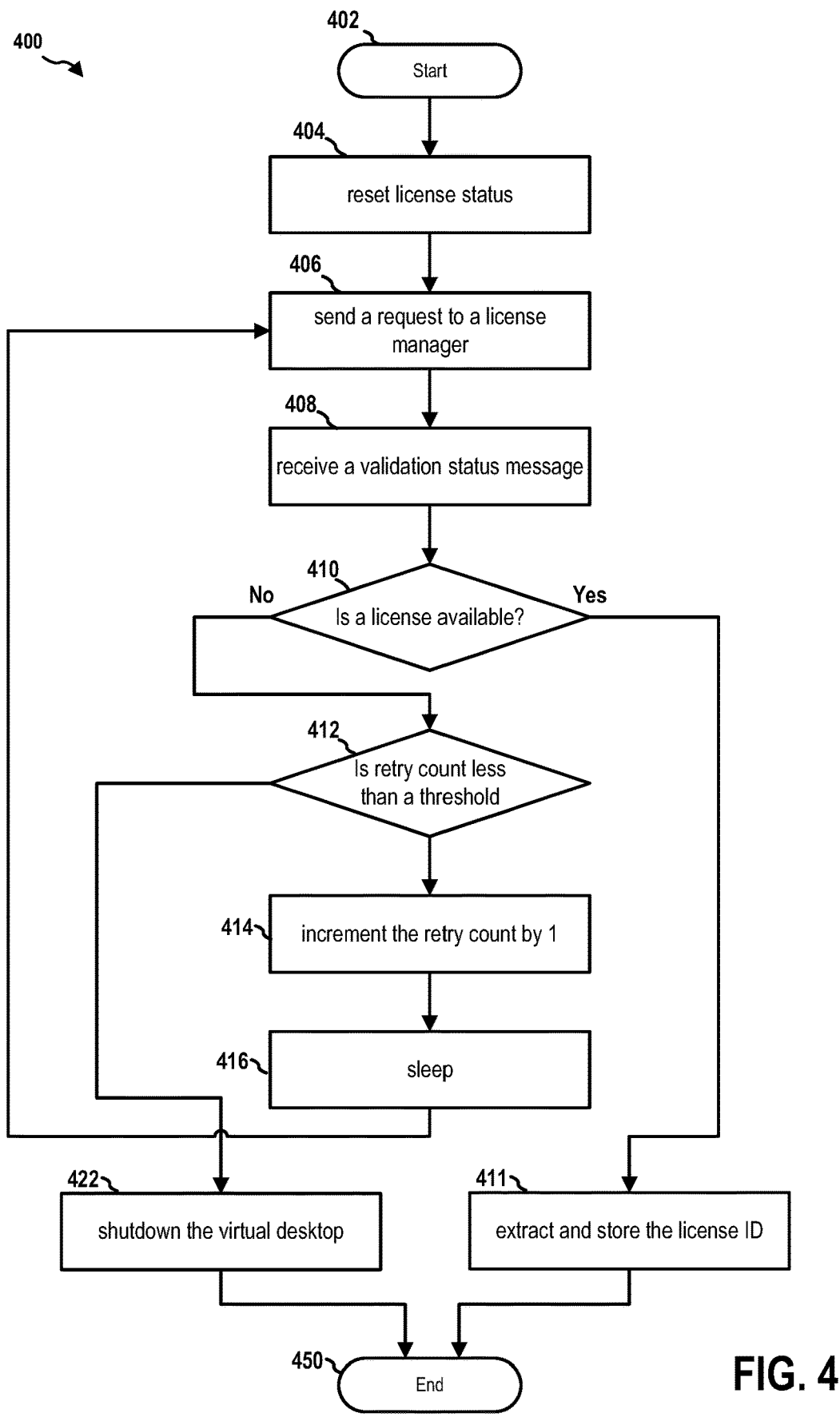
FIG. 4 is a flow chart of a method (process) for validating a license.

FIG. 4 is a flow chart 400 of a method (process) for validating a license. The method may be performed by the license agent 207 of a virtual desktop. The server systems 311(1) to 311(n) can create one or more collections of virtual desktops for one or more customers. Each of the virtual desktop can have its own dedicated virtual machine or can be allocated a virtual machine from a pool of virtual machines. In this example, a virtual desktop runs on one virtual machine of the VMs 321(1)-1 to 321(1)-M(1), the VMs 321(j)-1 to 321(j)-M(j), and the VMs 321(n)-1 to 321(n)-M(n).

Further, a customer may be assigned a number (e.g., 100, 200, etc.) of licenses. Each of the virtual desktops in a collection needs a valid license in order to be run on a virtual machine. Accordingly, at the initiation of a particular virtual desktop, prior to, during, or after a selected virtual machine (e.g., the VM 321(1)) loads the guest OS 208 of the virtual desktop, the license agent 207 of that virtual desktop is launched and starts accordingly a validation process at operation 402, prior to any of the client applications 206 is launched.

At operation 404, the license agent 207 resets the license status of the virtual desktop. That is, if the license agent 207 obtained a license from the license management module 304 in a previous execution, the license agent 207 will delete that license.

At operation 406, the license agent 207 prepares a request for validating a license to be sent to the license management module 304. In particular, the request may be delivered to the license management module 304 via HTTP over Secure Socket Layer (SSL) (HTTPS). Each of the virtual desktop may be configured with a unique identifier that can be used to identify the virtual desktop. Further, the virtual desktop may be assigned to a particular customer, which can be identified with a unique customer identifier. The license agent 207 includes the unique identifier and the customer identifier in the request. Further, as described infra, the license agent 207 may obtain a license associated with a license identifier from the license management module 304. The license agent 207 may be configured to re-validate the license of the virtual desktop in accordance with a schedule (e.g., hourly). In this scenario, the license agent 207 may include in the request the license identifier obtained previously and to be re-validated.

At operation 408, the license agent 207 receives a validation status message from the license management module 304. The validation status message indicates whether a license is available for the virtual desktop. For example, the validation status message may include a bit whose value "1" indicates that a license is available and "0" indicates that no license is available.

At operation 410, the license agent 207 determines whether the validation status message indicates that a license is available. When the validation status message indicates that a license is available, at operation 411, the license agent 207 extracts a license identifier from the validation status message. The validation status message may include a new license identifier for a new license allocated to the virtual desktop or the license identifier re-validated for the virtual desktop. The license agent 207 stores the license identifier within the virtual desktop. At operation 450, the license agent 207 ends the validation process and the virtual desktop proceeds with launching the client applications 206 of the virtual desktop.

When the validation status message indicates that a license is not available, at operation 412, the license agent 207 determines whether a retry count is less than a predetermined threshold (e.g., 3). The retry count has an initial value of 1, and is incremented by 1 each time the license agent 207 receives a validation status message indicating that no license is available or receives no validation status message within a predetermined time period (e.g., 10 seconds) after sending a request for validation to the license management module 304.

When the license agent 207 determines that the retry count is less than the predetermined threshold, at operation 414, the license agent 207 increments the retry count by 1. At operation 416, the license agent 207 sleeps for a predetermined time period (e.g., 0.5 second, 1 second, etc.). During this sleep period, another virtual desktop of the same collection may have released a license, or the customer may have acquired additional license (e.g., through new purchases). Subsequently, the license agent 207 goes back to operation 406.

When the license agent 207 determines that the retry count is not less than the predetermined threshold in operation 412, the license agent 207, at operation 422, shuts down the virtual desktop. The process also ends at operation 450.

Figure 5:
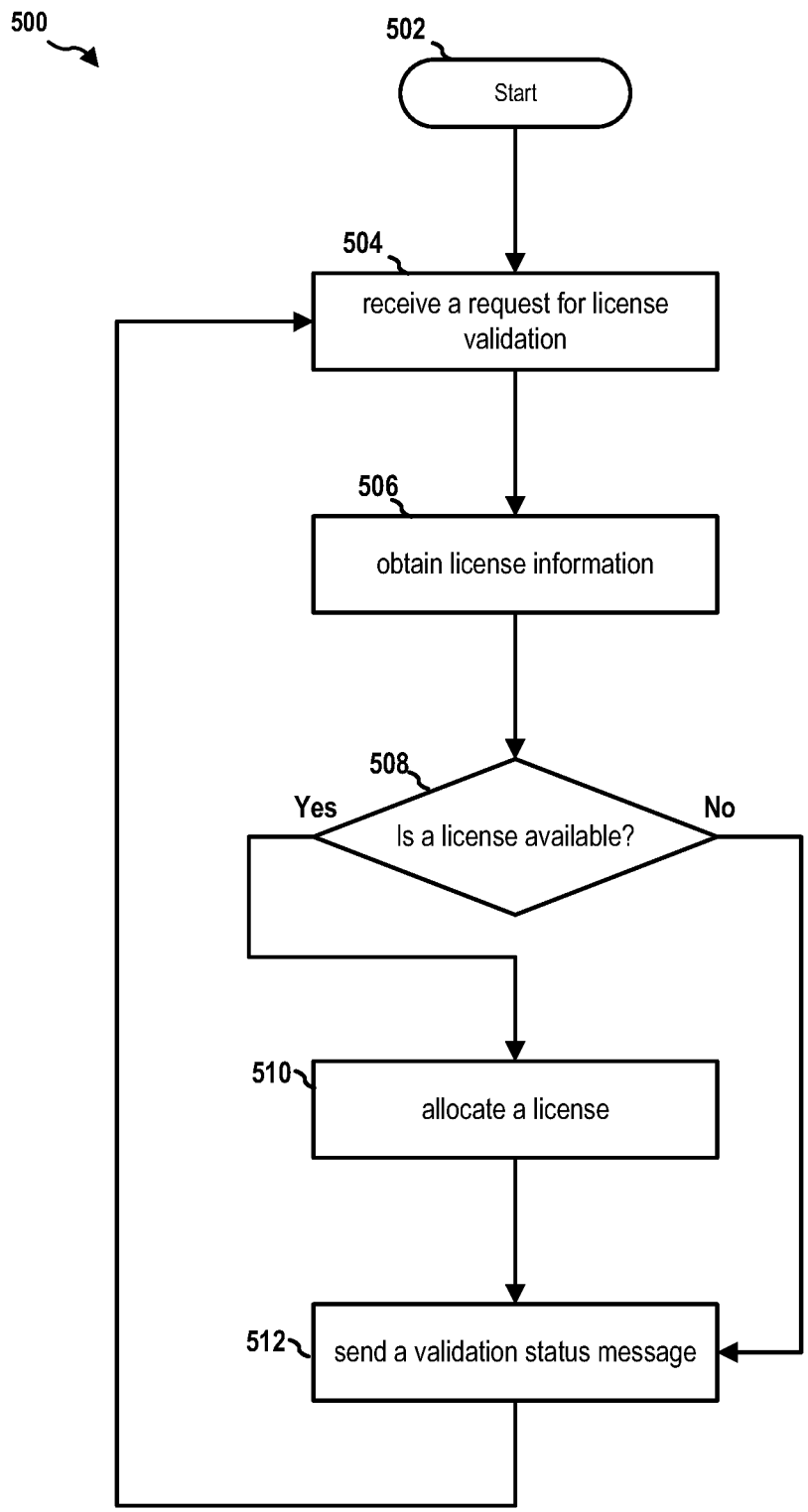
FIG. 5 is a flow chart of a method (process) for allocating licenses.

FIG. 5 is a flow chart 500 of a method (process) for allocating licenses. The method may be performed by the license management module 304. At operation 502, the license management module 304 starts the allocation process. At operation 504, the license request handler 372 of the license management module 304 receives a request for validating a license (e.g., through HTTPS). As described supra, the request includes a unique identifier identifying a particular virtual desktop, a customer identifier identifying a particular customer. The request may also include a license identifier. At operation 506, the license management module 304 obtains license information of the particular customer. More specifically, the license request handler 372 sends the customer identifier to the license counter 376. As described supra, the configuration component 382 stores the total licenses granted to collections of virtual desktops of a particular customer. The license counter 376 obtains the total license number for the particular customer from the data store 380. Further, each time the license counter 376 allocates a license to a particular virtual desktop, the license counter 376 updates the record in the data store 380 indicating the number of licenses that are in use. In this operation, the license counter 376 also obtains the number of licenses of the particular customer in use from the data store 380.

At operation 508, the license counter 376 determines whether a license is available to the particular virtual desktop requesting the license. More specifically, when a license identifier is included in the request, the license counter 376 retrieves a unique identifier stored in the data store 380 as associated with the license identifier. In other words, the unique identifier stored in the data store 380 indicates the current virtual desktop to which the license with the license identifier is allocated. The license counter 376 then determines if the unique identifier stored in the data store 380 matches the unique identifier contained in the request. When the unique identifiers match, the license counter 376 can determine that the license is still allocated to the particular virtual desktop sending the request. Therefore, the license counter 376 determines that a license with the same license identifier is available to the requesting virtual desktop.

During operation 508, when the received request does not contain a license identifier, the license counter 376 determines that the requesting virtual desktop requests a new license be allocated to the virtual desktop. Accordingly, the license counter 376 determines whether the total number of licenses assigned to the particular customer is greater than the number of licenses in use.

When the total number assigned is greater than the number in use, the license counter 376 determines that a license is available to the requesting virtual desktop. Subsequently, at operation 510, the license counter 376 allocates a license to the requesting virtual desktop. More specifically, the data store 380 stores a list of license identifiers of the licenses assigned to the particular customer. When a license is assigned to a customer, the data store 380 stores a data entry that associates the license identifier of the assigned license with the unique identifier of the virtual desktop receiving the license. The license counter 376 selects a license identifier that is not associated with any virtual desktop, and assigns a license with the selected license identifier to the requesting virtual desktop. The license counter 376 then creates an entry in the data store 380 associating the unique identifier of the requesting virtual desktop with the selected license identifier. The license counter 376 further updates the record in the data store 380 to indicate the number of licenses assigned to the particular customer that are currently in use. The license counter 376 increases the number in use by 1. The license counter 376 further sends the allocated license identifier to the license request handler 372. Then the process goes to operation 512.

During operation 508, when the total number assigned is not greater than the number in use, the license counter 376 determines that a license is not available to the requesting virtual desktop. Then the process goes back to operation 512.

At operation 512, the license request handler 372 prepares a validation status message. When a license is available to the requesting virtual desktop, the license request handler 372 may include in the validation status message a bit with value "1" (to indicate that a license is available as described supra) and the license identifier obtained for the requesting virtual desktop. When a license is not available to the requesting virtual desktop, the license request handler 372 may include in the validation status message a bit with value "0" (to indicate that a license not is available as described supra). The license request handler 372 then sends the validation status message to the requesting virtual desktop. Subsequently, the process goes to operation 504.

Figure 6:
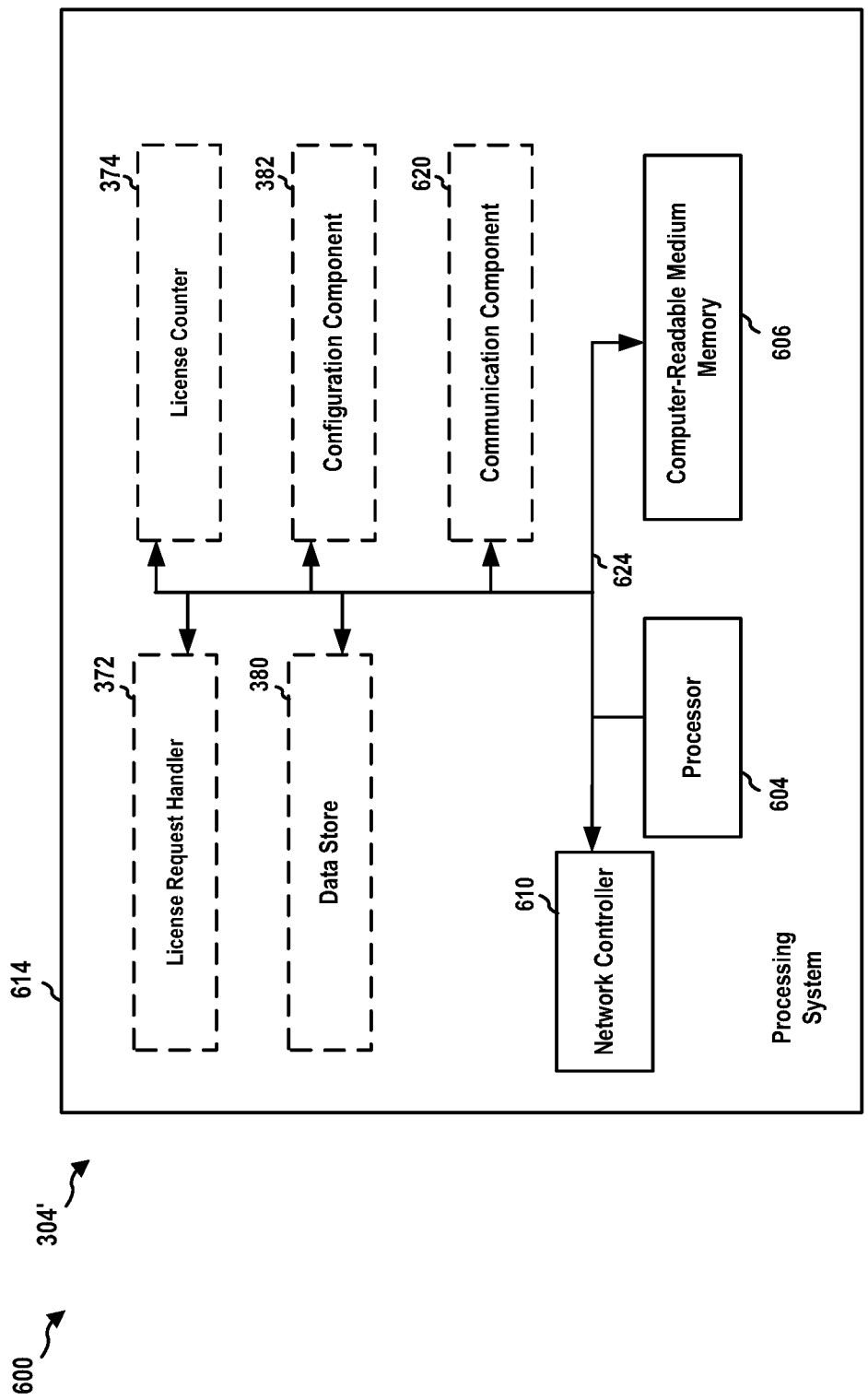
FIG. 6 is a diagram illustrating an example of a hardware implementation for an apparatus employing a processing system.

FIG. 6 is a diagram 600 illustrating an example of a hardware implementation for an apparatus 304' (e.g., the license management module 304) employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, including the processor 604 the computer-readable medium/memory 606, and the network controller 610. The bus 624 may also link various other circuits such as timing sources, peripherals, voltage regulators, and power management circuits, which are well known in the art, and therefore, will not be described any further.

The processing system 614 may be coupled to a network controller 610. The network controller 610 provides a means for communicating with various other apparatus over a network. The network controller 610 receives a signal from the network, extracts information from the received signal, and provides the extracted information to the processing system 614, specifically the communication component 620. In addition, the network controller 610 receives information from the processing system 614, specifically the communication component 620, and based on the received information, generates a signal to be sent to the network. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the license request handler 372, the license counter 376, the data store 380, and the configuration component 382. The components may be software components running in the processor 604, resident/stored in the computer readable medium/memory 606, one or more hardware components coupled to the processor 604, or some combination thereof.

The apparatus 304/304' may be configured to include means for performing each of the operations described supra referring to FIG. 5. The aforementioned means may be one or more of the aforementioned components of the apparatus 304' and/or the processing system 614 of the apparatus 304' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing a collection of virtual desktops, comprising:
    sending, at a first virtual desktop of the collection of virtual desktops, a first request for validating a license for the first virtual desktop to a license manager after completion of a booting process of the first virtual desktop and prior to launch any user application;
    receiving, at the license manager and from the first virtual desktop, the first request;
    determining, at the license manager, whether a license is available for the first virtual desktop;
    sending, at the license manager, a validation status message to the first virtual desktop to indicate whether a license is available for the first virtual desktop based on the determination;
    receiving, at the first virtual desktop, the validation status message; and
    resending, at the first virtual desktop, the first request to the license manager repeatedly until that a predetermined number of first requests has been sent to the license manager, when each validation status message received in response indicates that a license has not been allocated to the first virtual desktop;
    determining, by the first virtual desktop in response to sending the predetermined number of the first requests and to not being allocated a license, to shut down the first virtual desktop; and
    shutting down the first virtual desktop.

2. The method of claim 1, further comprising:
    allocating a first license to the first virtual desktop when a license is available for the first virtual desktop, wherein the validation status message indicates that a license has been allocated to the first virtual desktop.

3. The method of claim 1, wherein the determining whether a license is available further comprises:
    determining, at the license manager, a total number of licenses available for the collection of virtual desktops;
    determining a first number of licenses that have been allocated to virtual desktops of the collection;
    determining that a license is available when the total number is greater than the first number; and
    determining that a license is not available when the total number is not greater than the first number.

4. The method of claim 3, wherein the determining whether a license is available further comprises:
    determining whether a license has been allocated to the first virtual desktop previously, wherein the determining whether a license is available is performed in response to a determination that a license has not been allocated, wherein the validation status message is sent in response to a determination that a license has been allocated.

5. The method of claim 1, further comprising:
    continuing to launch one or more applications on the first virtual desktop when the validation status message indicates that a license has been allocated to the first virtual desktop.

6. An apparatus for managing a collection of virtual desktops, comprising:
    a memory storing one or more instructions; and
    at least one processor coupled to the memory and configured to execute the one or more instructions to:
    send, at a first virtual desktop of the collection of virtual desktops, a first request for validating a license for the first virtual desktop to a license manager after completion of a booting process of the first virtual desktop and prior to launch any user application;
    receive, at the license manager and from the first virtual desktop, the first request;
    determine, at the license manager, whether a license is available for the first virtual desktop;
    send, at the license manager, a validation status message to the first virtual desktop to indicate whether a license is available for the first virtual desktop based on the determination;
    receive, at the first virtual desktop, the validation status message; and
    resend, at the first virtual desktop, the first request to the license manager repeatedly until that a predetermined number of first requests has been sent to the license manager, when each validation status message received in response indicates that a license has not been allocated to the first virtual desktop;
    determine, by the first virtual desktop in response to sending the predetermined number of the first requests and to not being allocated a license, to shut down the first virtual desktop; and
    shut down the first virtual desktop.

7. The system of claim 6, wherein the at least one processor is further configured to:
    allocate a first license to the first virtual desktop when a license is available for the first virtual desktop, wherein the validation status message indicates that a license has been allocated to the first virtual desktop.

8. The system of claim 6, wherein to determine whether a license is available, the at least one processor is further configured to:
    determine, at the license manager, a total number of licenses available for the collection of virtual desktops;
    determine a first number of licenses that have been allocated to virtual desktops of the collection;
    determine that a license is available when the total number is greater than the first number; and determine that a license is not available when the total number is not greater than the first number.

9. The system of claim 8, wherein to determine whether a license is available, the at least one processor is further configured to:
  determine whether a license has been allocated to the first virtual desktop previously, wherein the determining whether a license is available is performed in response to a determination that a license has not been allocated, wherein the validation status message is sent in response to a determination that a license has been allocated.

10. The system of claim 6, wherein the at least one processor is further configured to:
  continue to launch one or more applications on the first virtual desktop when the validation status message indicates that a license has been allocated to the first virtual desktop.

11. A non-transitory computer-readable medium storing computer executable code for managing a collection of virtual desktops, comprising code, when executed by a processor, to:
  send, at a first virtual desktop of the collection of virtual desktops, a first request for validating a license for the first virtual desktop to a license manager after completion of a booting process of the first virtual desktop and prior to launch any user application;
  receive, at the license manager and from the first virtual desktop, the first request;
  determine, at the license manager, whether a license is available for the first virtual desktop;
  send, at the license manager, a validation status message to the first virtual desktop to indicate whether a license is available for the first virtual desktop based on the determination;
  receive, at the first virtual desktop, the validation status message; and
  resend, at the first virtual desktop, the first request to the license manager repeatedly until that a predetermined number of first requests has been sent to the license manager, when each validation status message received in response indicates that a license has not been allocated to the first virtual desktop;
  determine, by the first virtual desktop in response to sending the predetermined number of the first requests and to not being allocated a license, to shut down the first virtual desktop; and
  shut down the first virtual desktop.

12. The non-transitory computer-readable medium of claim 11, wherein the code is further configured to:
  allocate a first license to the first virtual desktop when a license is available for the first virtual desktop, wherein the validation status message indicates that a license has been allocated to the first virtual desktop.

13. The non-transitory computer-readable medium of claim 11, wherein to determine whether a license is available, the code is further configured to:
  determine, at the license manager, a total number of licenses available for the collection of virtual desktops;
  determine a first number of licenses that have been allocated to virtual desktops of the collection;
  determine that a license is available when the total number is greater than the first number; and
  determine that a license is not available when the total number is not greater than the first number.

14. The non-transitory computer-readable medium of claim 13, wherein to determine whether a license is available, the code is further configured to:
  determine whether a license has been allocated to the first virtual desktop previously, wherein the determining whether a license is available is performed in response to a determination that a license has not been allocated, wherein the validation status message is sent in response to a determination that a license has been allocated.

* * * * *